United States Patent [19]

Schneider et al.

[11] 4,346,444
[45] Aug. 24, 1982

[54] CONSTANT THRUST ADAPTIVE CONTROL MACHINE TOOL

[75] Inventors: Samuel Schneider, San Diego; John D. Beyer, Poway, both of Calif.

[73] Assignee: Rohr Industries, Inc., Chula Vista, Calif.

[21] Appl. No.: 132,252

[22] Filed: Mar. 20, 1980

[51] Int. Cl.³ .................... G06F 15/46; G05B 19/18
[52] U.S. Cl. .................... 364/475; 318/571; 408/11; 364/148
[58] Field of Search ............ 364/474, 475, 105, 148, 364/152, 167–171, 172, 174; 318/571, 39, 561; 408/3, 8–13, 7, 710; 409/134, 188, 189, 903

[56] References Cited

U.S. PATENT DOCUMENTS

| | | | |
|---|---|---|---|
| 3,259,023 | 7/1966 | Rieger et al. | 408/11 X |
| 3,418,549 | 12/1968 | Emerson et al. | 318/39 |
| 3,548,172 | 12/1970 | Centner et al. | 318/571 X |
| 3,849,712 | 11/1974 | Lankford et al. | 318/571 X |
| 4,031,368 | 6/1977 | Colding et al. | 364/475 X |
| 4,078,195 | 3/1978 | Mathias et al. | 318/571 X |
| 4,208,718 | 6/1980 | Chung | 408/10 X |

*Primary Examiner*—Joseph F. Ruggiero
*Attorney, Agent, or Firm*—Patrick J. Schlesinger

[57] ABSTRACT

A metal working machine for moving a cutting tool through a metal workpiece which includes a spindle carrying a cutting tool therein, a feed drive motor for advancing the spindle, and a rotation drive motor for rotating the spindle. The workpiece is firmly held by a variable force clamp in an operative position to permit the cutting tool to move therethrough. The thrust of the cutting tool is sensed as well as the rotational velocity of the spindle. A data memory contains the optimum thrust load against a predetermined workpiece material for a cutting tool having a predetermined diameter dimension. A data proceser, upon selection of the optimum thrust load for the tool to be used and the particular workpiece, is coupled to the rotational velocity sensor and provides an output to the feed motor, the rotational drive motor, and the clamp to rotate and advance the cutting tool into contact with the workpiece at the predetermined optimum thrust load and to maintain the clamping force in excess of the predetermined thrust load. In order to maintain the thrust load constant, the feed and the speed of the spindle are sampled intermittently, with the feed being sampled more often than the speed.

37 Claims, 14 Drawing Figures

CONSTANT THRUST ADAPTIVE CONTROL MACHINE TOOL

BACKGROUND OF THE INVENTION

Field of the Invention

This invention relates to improvements in machine tool control systems and more particularly, but not way of limitation, to a metal working machine control system for moving a cutting tool through a metal workpiece whereby the cutting tool maintains a constant thrust against the workpiece.

In the past it has been recognized that in the cutting of metal, especially for aerospace applications, that improvements in such cutting methods was essential. While variations in material are unimportant when cutting soft materials with hard tools, such variations become very important when cutting hard material with only slightly harder tools. With the advent of increasingly hard to machine materials, which materials would include heat resistant materials that are low in Rockwell number as well as hard materials, great difficulties have been encountered in providing cutting tool control systems that adequately and economically meet the needs for cutting hard materials. While there have been the traditional problems of attempting to eliminate the danger of drill breakage and increasing production rate by decreasing the amount of metal cutting time as well as avoiding effects on the metal by the cutting metal procedure itself such as generating excessive heat in producing a hole, there have been additional problems encountered.

As the cost of energy, among other manufacturing costs, has gone up the cost of raw materials used in aerospace applications has reached unprecedented heights thereby making it imperative that the amount of scrap be reduced to the minimum in the manufacturing process. While the cost of material has gone up, the cost of direct labor has also risen to previously unknown highs thereby making it doubly important that the production rate be increased to the greatest extent possible. Unfortunately, while these needs have become increasingly important, the availability of skilled workers for such manufacturing processes has diminished.

It was possible in the past to conduct some metal machining processes, without extensive additional machine controls, solely by using skilled machinists who could, by reason of long experience, provide a touch or feel for manually regulating the processes. However, even with such experienced personnel, the touch of such personnel would diminish over the course of the day as a person would become tired and the manufacturing efficiency of the process would decrease. Since it is becoming increasingly necessary to employ relatively inexperienced personnel in conducting certain metal working processes, it is essential that control systems be provided that would provide for the metal machining process to be conducted at optimum efficiency not only from the point of view of time required for the process but also for the process to be conducted in the most economical manner to preclude such effects such as tool breakage, undue regrinding of the tool, and heat treating of the material by the inherent aspects of the metal machining process. It is believed that the present metal machining control system achieves more of the required standards and avoids more of the difficulties than any metal machining control system heretofore known in the art.

One known process for controlling the operation of the machine tool entails measuring the working torque applied by a cutting tool to the workpiece, the power applied to the tool and the deflection to which the tool is subjected during working. In such a process the quantities which are controlled are the cutting speed and the advance speed of the tool. Control quantities are tied to quantities measured by rather complicated predetermined equations. Control of the cutting feed and of the feed speed of the tool is affected by an analog computer which solves said equations. This process suffers from fundamental disadvantage of using specially programmed measuring instruments that are both very complex and costly.

Processes are also known for the control of production machining, by means of machine tools, of a series of workpieces in which the temperature of the cutting region is measured and the state of the cutting tool is also monitored constantly, these two parameters being utilized in the automatic control of the cutting speed of the tool. The fundamental disadvantage of such processes lies in the fact that the measurement of the temperature in the cutting region is particularly complicated and difficult. In fact, this temperature is influenced by the mass flow of coolant, the form of cutting produced and by variations in the conditions of contact between the cutting tool and the workpiece, which in turn depend on the type of tool and which vary with each sharpening of the tool. The temperature in the cutting region therefore undergoes considerable variations even over very short periods, and in practice the temperature measurements will be limited to the mean temperature over a period and the mean temperature of an area of the workpiece of excessive dimensions.

In another metal working machine, a number of different conditions relating to the cutting tool are sensed and acted upon to maintain the spindle torque substantially equal to a command value. The conditions which are sensed include the feed velocity, the feed position, the feed thrust, the spindle velocity and the spindle torque. The feed of the cutting tool and the rotational velocity of the spindle are adjusted to adjust the spindle torque substantially equal to a predetermined value. Another requirement of this process requires the determination of tool geometry and the special grinding of such tools to permit this process to operate successfully. The optimum values of feed, velocity, spindle torque and spindle velocity as related to the cutting edge and contact for a specfic tool and material are to be determined by analysis and testing. Quite obviously, it requires a very complicated control system in order to sense a multiplicity of values, to process them, and to then control the torque of the machine tool. Additionally, it takes the skills of very experienced operators, not only used to operating machine tools but also to utilizing electronic control systems, to control such machine tools. Quite clearly, such operators are expensive and not readily available.

A related system was a machine control system utilizing specially wound DC motors. The specially wound DC motors were settable to have particular speed-torque droop characteristics. This speed droop characteristic was used to regulate the torque of the machine as the feed of the machine tool was also regulated. Since the thrust of the tool against the workpiece was interdependent with the torque of the tool rotation, the torque of the tool rotation drive was maintained substantially equal to a predetermined ratio with the thrust. This machine tool control system does require the use of specially wound DC motors and relies upon the operator being skilled at setting the motor characteristics and the ratio of thrust to torque to be able to operate the system satisfactorily. Thus, the need for special equipment and the need for specially trained skilled operators does not render this process to be advantageous for today's conditions.

SUMMARY OF THE INVENTION

The present invention provides a metal working machine for moving a cutting tool through a metal workpiece which includes a spindle having means for carrying a cutting tool therein. Feed drive means for advancing the spindle and rotation drive means for rotating the spindle are also included. The workpiece is firmly held by clamping means in an operative position to permit the cutting tool to move therethrough. The thrust of the cutting tool is sensed as well as the rotational velocity of the spindle. A means is provided for determining the optimum thrust load against a predetermined workpiece material for a cutting tool having a predetermined diameter dimension. A control means is then coupled to the input means, the rotational velocity sensing means, and the thrust sensing means and provides an output to the feed means, the rotational drive means, and the clamping means to rotate and advance the cutting tool carried by the spindle into contact with the workpiece at a predetermined optimum thrust load and to maintain the clamping force in excess of said predetermined thrust load. In order to maintain the thrust load constant, the feed as well as the velocity of the spindle is sampled intermittently and the feed is sampled more often than the rotational velocity.

While the clamping means holds the work in a predetermined position while the cutting tool moves therethrough, it does not exert a force sufficient to mar the workpiece but only exerts a force in excess of the thrust load so that the metal workpiece is maintained continually in a fixed position. The control means also reduces the feed of the cutting tool immediately prior to contact with the tool with the metal workpiece to insure adequate heat dissipation of the tool as it begins cutting through the workpiece and then regulates the feed of the tool so that the desired thrust load is maintained throughout the workpiece until the cutting face of the cutting tool completely emerges from the workpiece at which time the tool is retracted.

As the cutting tool is maintained at a constant thrust load through the workpiece, the feed of the cutting tool is adjusted to insure the thrust load remains constant. However, if the thrust load remains constant for a predetermined period of time and the feed rate of the cutting tool is less than a predetermined portion of a predetermined feed rate for the cutting tool, the cutting operation is terminated and the cutting tool is withdrawn since this condition indicates that the cutting tool has been dulled and needs to be either replaced or resharpened.

This invention, as well as other features, objects and advantages thereof, will be readily apparent from consideration of the following detailed description relating to the accompanying drawings in which like reference characters designated like or corresponding parts throughout the specification.

DETAIL DESCRIPTION OF THE PREFERRED EMBODIMENT

Figure 1:
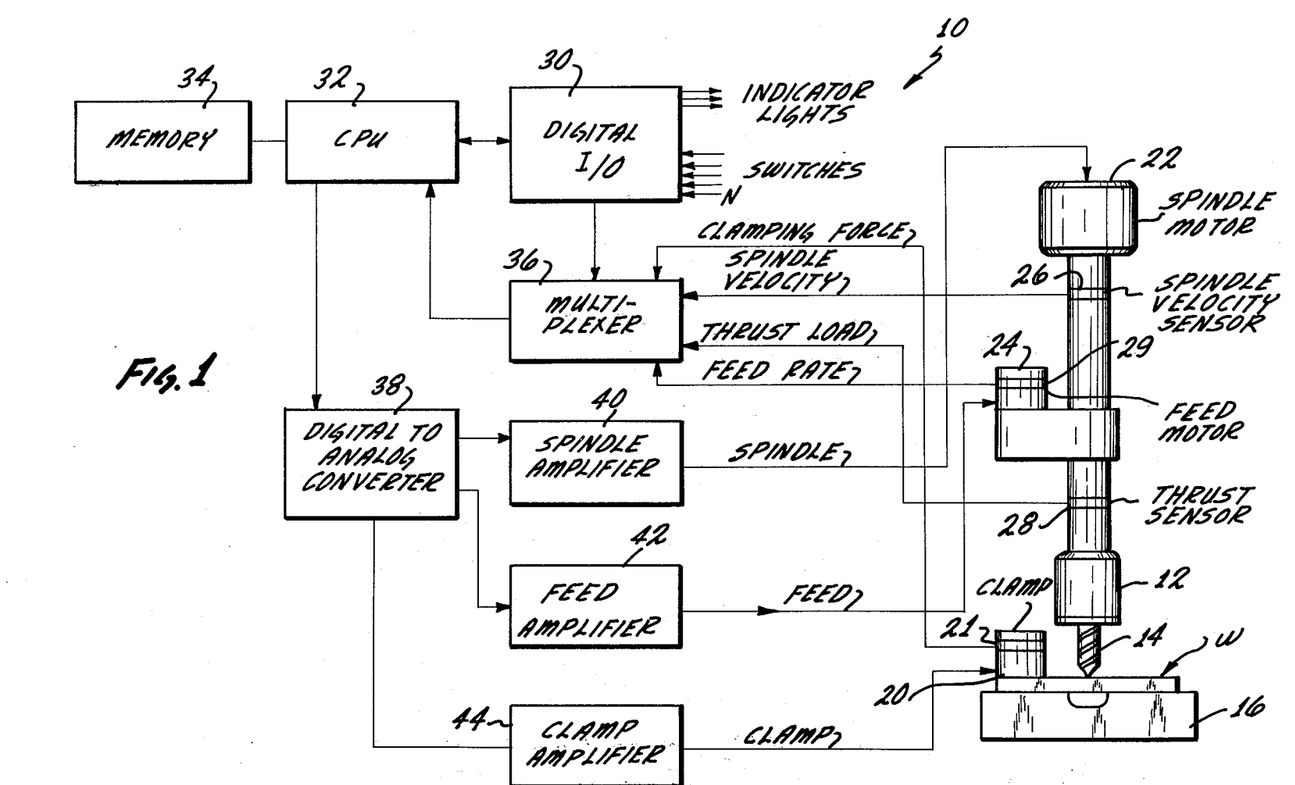
FIG. 1 is a block diagram of a metal working machine embodying the preferred form of this invention.

Referring to the drawings in detail, and particularly FIG. 1, reference character 10 designates one embodiment of a metal working machine constructed in accordance with this invention. The metal working machine 10 includes a spindle 12 which further includes means for carrying a cutting tool 14 therein. The metal working machie 10 would also be provided with a suitable bed 16 for holding a metal workpiece indicated by reference character W. A suitable clamping means 20 is provided for clamping the workpiece W in a position to permit the cutting tool 14 to move therethrough. It would be within the scope of the invention to provide a pneumatic, hydraulic, or electro-mechanical clamping means 20 to clamp workpiece W against the bed 16. It will be obvious that the clamping means 20 must be highly responsive to control by an electronic means as will be discussed in greater detail hereinafter. A sensor 21 senses the clamping force being exerted on the workpiece W by the clamp 20 and provides an electrical output representative thereof.

A rotation drive means for rotating said spindle 12 is provided. In the illustrated embodiment of the invention, this rotational drive means takes the form of a suitable spindle motor 22. A feed drive means for advancing said spindle 12 is also provided. This feed drive means takes the form of a suitable feed motor 24 coupled to said spindle 12 for moving the cutting tool 14 through the metal workpiece W as the rotation drive means rotates the spindle 12. A spindle velocity sensor 26 senses the rotational velocity of said spindle 12 and provides an electrical output representative thereof. A thrust sensor 28 senses the thrust of the cutting tool 14 against the workpiece W and provides an electrical output representative of said thrust. A feed sensor 29 senses the feed and vertical position of the cutting tool 14 through the material W and provides an electrical output representative thereof.

Figures 2, 3E, 6B:
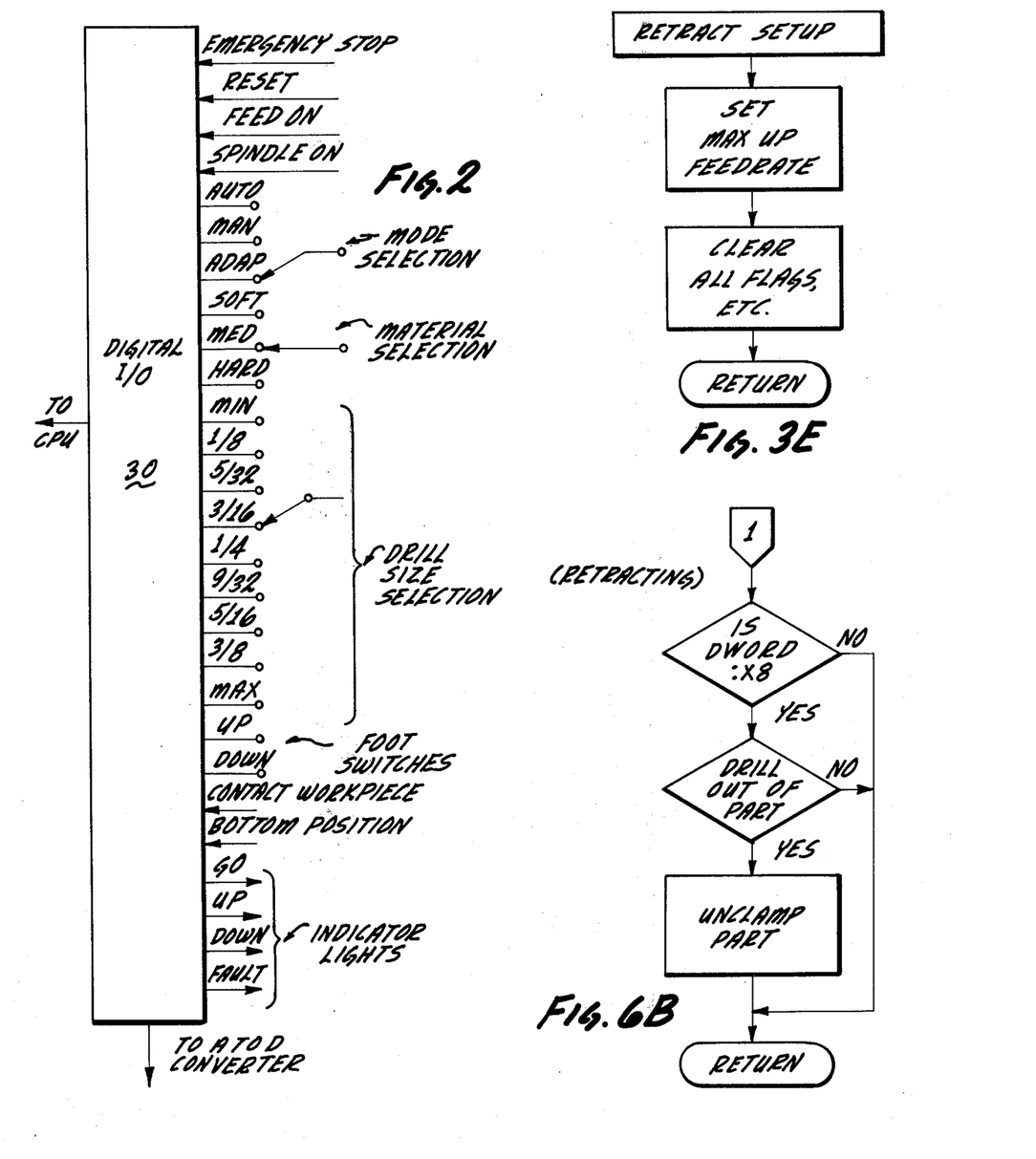
FIG. 2 illustrates a manually settable input/output means of the present invention.
FIGS. 3A through 3E are flow charts illustrating the adaptive control feature of the present invention.
FIG. 6A through 6B are flow charts illustrating the clamping feature of the present invention.

A manually selectable input means 30 provides suitable digital input and output signals. Referring now to FIG. 2, it will be seen that the digital input/output means is provided with a plurality of switches. As will be seen from an inspection of FIG. 2, these switches indicate values, are very simple to operate, require very little knowledge by an operator, and involve no calculations by the operator or consideration of formulas or ratios. A mode selection is provided whereby the operator can determine whether the machine 10 is to be placed under manual control during which the automatic features of the machine are disengaged and the feed is controlled entirely manually by the operator. An instance of such a choice of mode would be the drilling of soft material with a hard tool, in which instance the use of the adaptive feature of the machine tool 10 would not be of any material assistance.

Similarly, in the machining of a soft material by a harder tool, the operator may choose the automatic sequence in which a predetermined spindle speed and a predetermined feed rate is set and the adaptive control feature would be of minimal advantage in such machining situations.

The machine 10 may also be set to the adaptive control feature which is the mode of control of interest for the present invention. The material selection is made by the operator who only has to choose between soft, medium and hard materials. An example of soft material commonly found in aerospace applications is mild steel, and an example of a medium hard material is titanium (6AL4V). A commonly encountered hard material is Inconel (718), and it is primarily this application in which adaptive control feature of the machine 10 would be enabled.

The drill size selection is also determined by manipulation of manually selectable means. While commonly used drills in aerospace applications are shown for illustrative purposes, it is not intended that the invention be limited in any respect to the particular size of drills shown in FIG. 2. A number of other switches are provided to turn the feed on, turn the spindle on, and various other switches to retract the spindle as well as to start the spindle on a downward path.

A switch is provided to provide a digital input when the cutting tool contacts the material in a certain cutting mode as well as to indicate when the drill has advanced sufficiently downward that it would have completed its cutting path through the tool. The purpose of these switches will be discussed in more detail hereinafter.

The digital input/output means 30 also has certain lights which indicate to the operator the state of operation of the machine tool 10. The digital input/output means 30 is coupled to a data processing means having a central processing unit 32 and an associated memory means 34. It will be appreciated that the memory means 34 may be of any suitable type and may include paper tape drives, magnetic tape drives, disc drives, flip flops and the like. Preferably, however, for use in a production facility, it is preferred that the memory 34 be provided with a read only memory section in which certain predetermined values are stored and a random access section to which the values may be transferred for use as required by the CPU of the data processing means 32.

An illustrative example of a data processing means that has been successfully used in the practice of the present invention is the Model LS13-05 computer which is manufactured by Computer Automation, Inc. It will be appreciated that the I/O means 30 will be constructed to provide the requisite voltage levels as specified in the owner's manual for the Model LS13-05 computer.

The spindle velocity sensor 26, the thrust sensor 28, the feed sensor 29, and the clamp sensor 21 are coupled to a multiplexer unit 36. The multiplexer 36 is coupled to the data processing means 32 and the digital input/output means 30 is coupled to the multiplexer 36. The control signals generated by the central processing unit 32 in response to the inputs from the digital input/output means 30 and the spindle velocity, feed, thrust, and clamp signals received from the multiplexer 36 are coupled to a digital to analog converter 38. The spindle control signal, after conversion to an analog value by the digital to analog converter 38, is then amplified by a suitable spindle amplifier 40 and applied to the spindle motor 22. Similarly, the feed control signal, after being converted from a digital to an analog value by the converter 38, is applied to the feed motor 24 after being amplified by a suitable feed amplifier 42. Clamping control signals generated by the CPU 32 is coupled to the digital to analog converter 38, which converts the clamping control signal to an analog signal that is then applied to the clamp means 20 after being suitably amplified by the clamp amplifier 44.

Commercially available amplifiers which have been successfully employed as the spindle amplifier 40, the feed amplifier 42, and the clamp amplifier 44 are the Model N150 amplifiers manufactured by the Gettys Company of Racine, Wisconsin.

Figure 4:
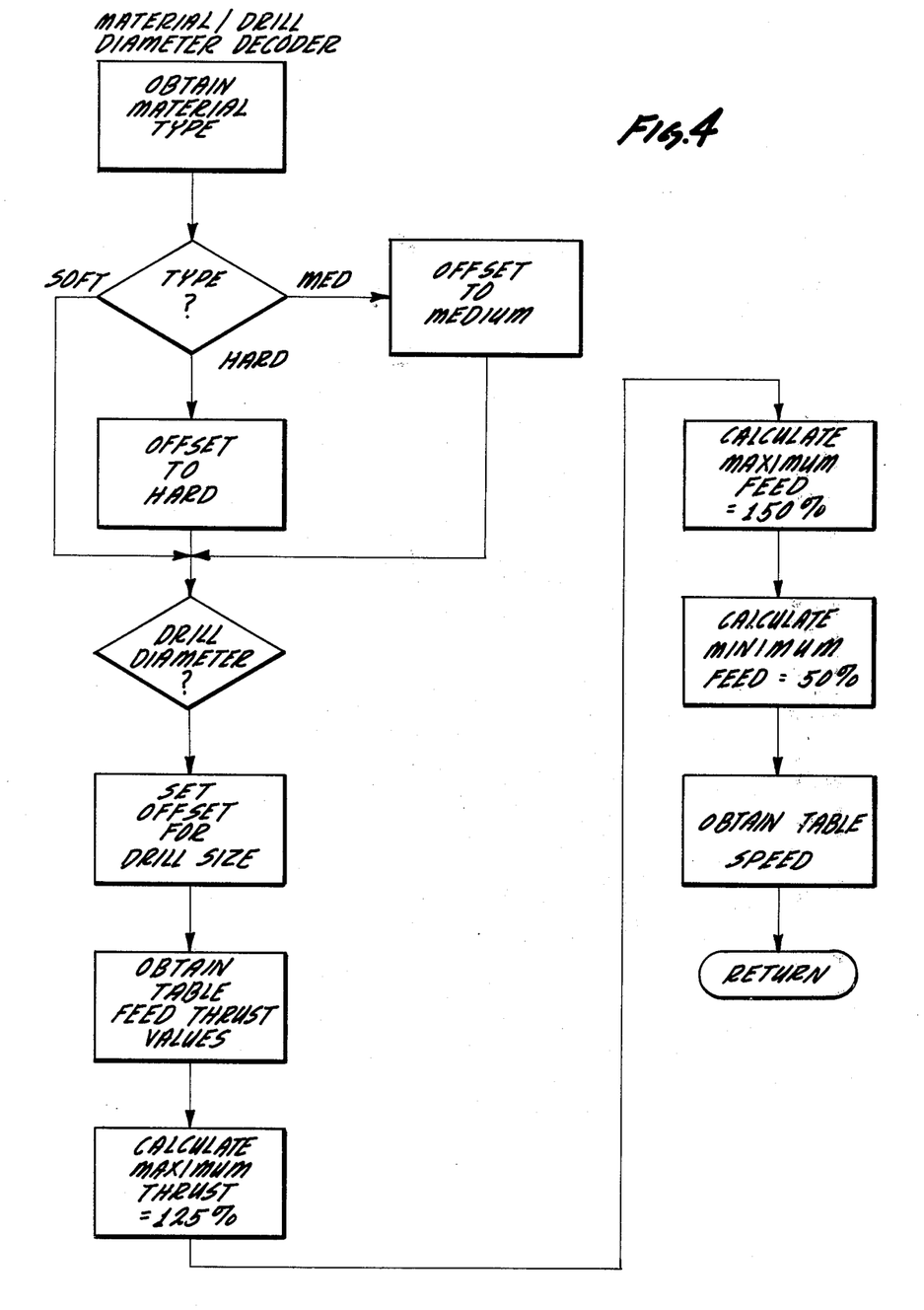
FIG. 4 is a flow chart illustrating the decoding of the digital input/output means shown in FIG. 2.

Referring now to FIG. 4, it will be illustrated how the cutting machine control 10 can operate to decode the material and drill diameter manually set on the digital I/O means 30. The CPU 32 obtains the material type from the I/O means 30 and determines whether it is soft, medium or hard. If it is medium or hard, an offset is made to the section of the memory 34 in which the value for those materials is placed. Next, the CPU 32 checks the drill diameter set on the digital I/O means 30, and again sets to the offset in the material section corresponding to the particular drill diameter specified. At that point, the CPU reads the values set at that address for the predetermined optimum speed and thrust values. The CPU 32 then calculates the value of a 125 percent of the maximum thrust value for a purpose which will be described in greater detail hereinafter.

Similarly, the CPU 32 then calculates the maximum speed rate which is for present purposes considered to be 150 percent of the predetermined optimum rate. Next, the CPU 32 calculates the minimum feed rate which for present purposes is considered to be 50 percent of the optimum feed rate. The CPU 32 then stores in one section of the memory 34 the optimum predetermined speed for the material type and drill diameter and the optimum feed rate to provide the predetermined optimum thrust to be exerted by the cutting tool 14 against the workpiece W as well as the other noted calculated values.

In appendices 1–3 are set forth the optimum values of thrust, speed, and feed for soft, medium and hard materials.

Prior to utilizing the adaptive control feature of the machine control system 10, the operator having manually set the diameter of the drill and the hardness of the material into the input/output means 32, then manually lowers the spindle 12 until the cutting tool 14 contacts the workpiece W at which time the operator sets the contact workpiece switch of the input/output means 30 shown in FIG. 2. The operator then moves the workpiece W laterally on the bed 16 and lowers the spindle 12 further so that the cutting face of the cutting tool 14 is completely below the lower face of the workpiece W, which position would preferably be approximately 0.125 of an inch, for the drilling of a simple material as an example. The operator then sets the bottom position switch of the input/output means 30.

With the machine control system 10 set in the adaptive mode, the material hardness and drill diameter set, and the top and bottom positions set as previously hereinbefore set forth, the operator is ready to begin drilling parts. It will be evident that the aforementioned operations require very little skill and do not require solving of equations or determining ratios, but are simple operations well within the skill of the ordinary person.

The control of the machine cutting tool system 10 is provided by a data word having for present illustrative purposes two digit positions. When the adaptive control mode has been set and the other operating conditions manually set as described, the data control word will be 0:81. Manual control of the feed motor 24 is enabled and permits the operator to manually lower the spindle 12 and driven cutting tool 14 to the point at which the GO light turns on. In the present illustrated embodiment, the GO light turns on at 0.040 of an inch above the surface of the workpiece W. The operator then removes her feet from the manual controls of the system 10 since the spindle 12 is now under complete control of the machine control system 10.

The control data word is automatically switched to 0:82, which directs the spindle to commence decelerating until a point approximately 0.010, by way of illustration, from the upper face of the workpiece W. As will be seen in FIG. 8, the feed of the spindle 12 is very high until the GO position, at which time the spindle decelerates down to a point at which the feed and rotational velocity of the spindle 17 are at the optimum values to provide the optimum thrust for the particular workpiece W. The data control word is then switched to 0:84. At 0.010 of an inch from the upper surface of the workpiece W, the predetermined feed rate and predetermined speed is imposed on the spindle motor 22 as it hits the part. Thus, it is insured that the drill 14 does not contact the part W at a speed or with a force that would tend to injure the drill.

Figure 9:
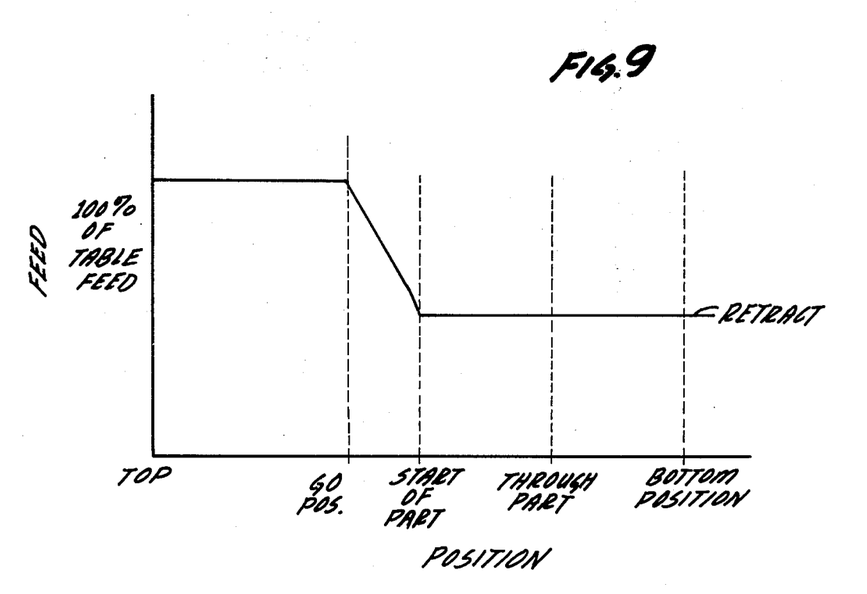
FIG. 9 is a diagram relating the feed rate of the spindle to the position of the cutting tool for the automatic control mode of the present invention.

If the mode of the cutting machine tool 10 has been placed in the automatic mode, then the data control word would remain 0:84 and a predetermined feed and predetermined speed for the spindle 12 would be maintained for the part of the thrust would be permitted to vary. This would be a situation where the soft material was being cut by a much harder tool as seen in FIG. 9.

However, in the instance of cutting a hard material by a harder too, the adaptive control mode would be selected and at the point that the cutting tool 14 contacted the workpice W, the data control word would be switched to 0:94. From there through the remainder of the part W, the cutting tool would be maintained at a constant thrust while the feed and rotational velocity of the spindle 12 are sensed intermittently. The feed is permitted to vary within 50 to 150 percent of the predetermined feed rate and the rotational velocity of the spindle is maintained within a certain predetermined band while the thrust of the cutting tool 14 is maintained substantially constant against the workpiece W.

As the cutting tool 14 emerges from the bottom of the workpiece W, the load imposed on the cutting tool 14 by the workpiece W is obviously lessened. If the cutting tool 14 were not controlled, it would tend to speed up and since there is less material contacting the cutting face of the cutting tool 14, there is less material to dissipate the heat generated by the contact between the cutting tool 14 and the workpiece W, thereby tending to not only dull the cutting edge of the cutting tool, but also to heat-treat the portion of the workpiece W immediately surrounding the cutting surface of the cutting tool 14 and to overheat the drill.

In the present invention, the feed remains under control of the machine tool system 10 until the bottom position is reached. The feed of the cutting tool is permitted to vary 100 to 150 percent of the predetermined bottom feed rate until the bottom position is reached. When the cutting tool reaches the bottom position, the data control word is switched to 0:88 and the spindle 12 is retracted by the feed motor 24 until it reaches an upper limit switch, at which time the data control word is again switched to 0:81 in order that the workpiece W may be then moved to a new position for the drilling of another hole or another workpiece W placed on the bed 16 for the drilling of the new workpiece W.

Referring now to FIG. 3, the adaptive control feature of the machine control system 10 will be discussed. FIG. 3 illustrates a flow chart of the control of the feed of the spindle 12 to maintain a constant thrust of the cutting tool 14 against the workpiece W. The sensing of the thrust of the cutting tool 14 against the workpiece W is maintained continually by the thrust sensor 28 and the feed rate of the spindle in the direction of workpiece W is updated or checked at a predetermined time. Preferably, this time period is constant, but it would be within the scope of this invention to check the feed on an interrupt-priority basis.

As will be discussed later, in the illustrative embodiment of the invention, the feed rate of the spindle 12 is checked every 40 milliseconds while the rotational velocity of the spindle 12 is checked on a much greater interval, which in the present instance by way of illustration and not by way of restriction is 10 seconds. It has been discovered that in maintaining the thrust of the cutting tool 14 constant that it is necessary to frequently check the feed rate of the cutting tool and to less frequently check the speed or the rotational velocity of the cutting tool 14 and to do so in order to maintain it within a rotational velocity bank and thereby avoid deleterious effect to the cutting tool 14.

In FIG. 3, it will be seen that the CPU first determines whether the data control word is active. If it is, a check is then made to determine whether the data word is 0:81. For the purposes of the following discussion, the X will generally be considered to be the integer 8 except where specifically provided that it would be 9. If the data control word is :X1, it is next determined whether the cutting tool is within the GO range or in the present instance within 0.040 inches of the upper surface of the workpiece W. If it is within the GO range, the predetermined feed rate as seen in the accompanying table in the Appendices is located in the memory 34.

The manual control of the cutting machine tool system 10 is then disenabled and the data control word switched to :X2, whereupon the system 10 returns to commence following the adaptive control system flow path. Once the data word is determined to be :X2, a check is made to determine whether the cutting tool 14 has progressed to the point where it is almost touching the workpiece W, which is presently determined to be 0.010 inch from the upper surface of the workpiece W. It will be recalled that during the data control word 0:82, that the feed rate of the cutting tool 14 is decelerated so that cutting tool 14 contacts the workpiece W at the feed and rotational velocity to yield the predetermined optimum thrust. Once it has been determined that the cutting tool is within 0.010 inch of the upper workpiece W, the optimum thrust value is stored and a value which is 50 percent of the optimum feed rate is calculated and the data control word set to :X4. If the data control word is :X4, the CPU 32 will determine whether the cutting tool 14 is at the bottom position. Since it would not be in the present instance since the cutting operation has just started, it is then determined whether the data control word is 0:84 or 0:94. If it is neither, then the automatic control mode would be set, a check is then made to determine whether the drill is dull. If it is a dull drill, the machine 10 faults and retracts the drill 14. If the data control word is :84, which it would be in the instance that the adaptive mode has been set, it is determined whether the cutting tool 14 has contacted the part W. If it has not, then the machine determines whether the thrust is greater than 50 percent of the calculated optimum thrust, if so, the data control word is then set to 0:94 and the adaptive control loop is restarted.

Referring again to FIG. 3B, if the data control word is 0:94 and the part W has been contacted, a check is made to determine the amount of time for which the cutting tool has been maintaining a thrust equal to or greater than 125 percent of the optimum thrust load. If it has been there longer than a predetermined time period, it is an indication of a dull drill and the machine 10 is then faulted and the cutting tool 14 is retracted. If it is not, the thrust sensed by the thrust sensor 28 is compared to the optimum thrust for the cutting tool 14 against the workpiece W. If it is above the optimum thrust value, the signal is given to the CPU 32 and directed to the digital to analog converter 38 to decrease the feed of the spindle 12.

Figure 3A:
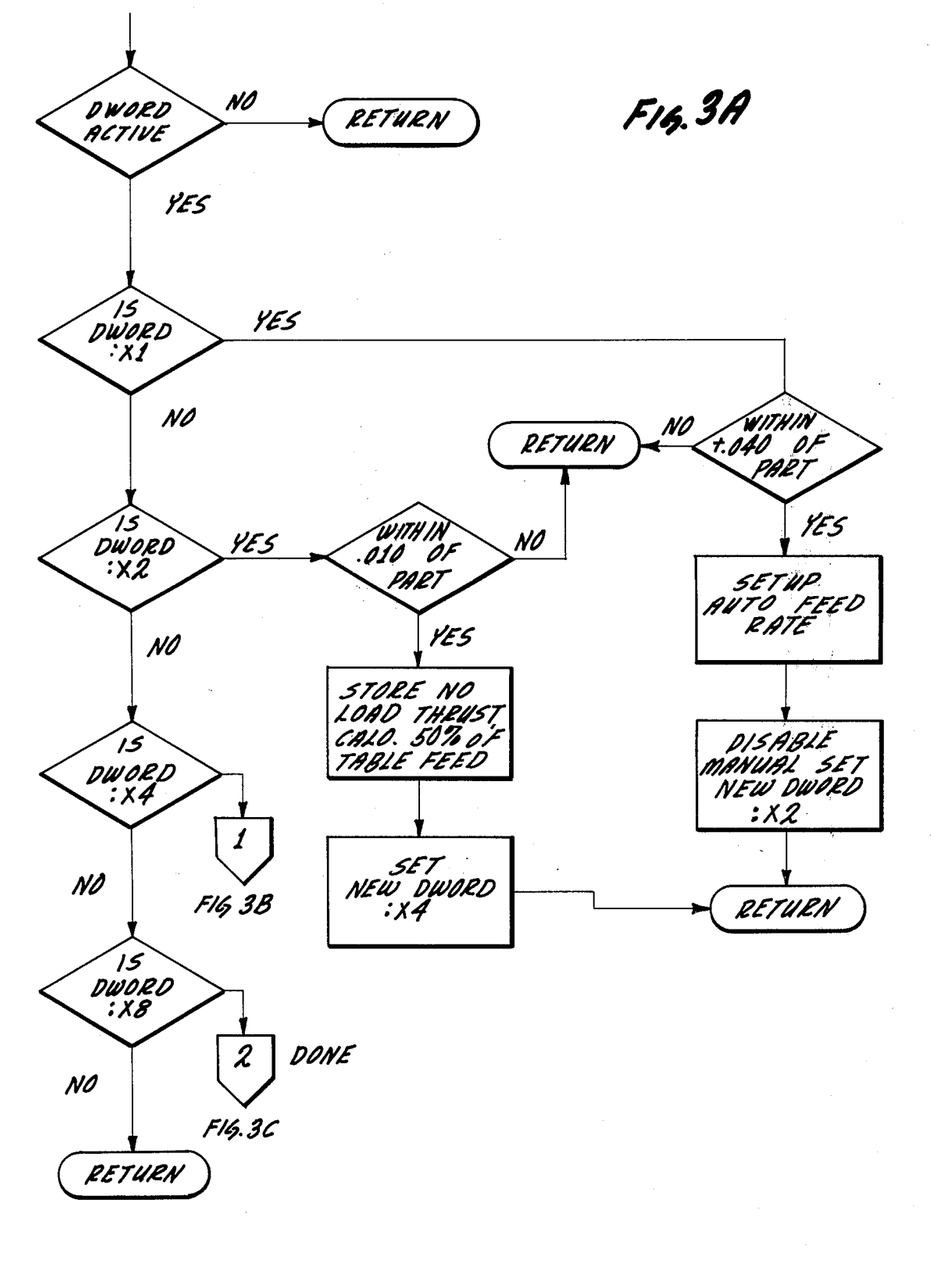
Figure 3B:
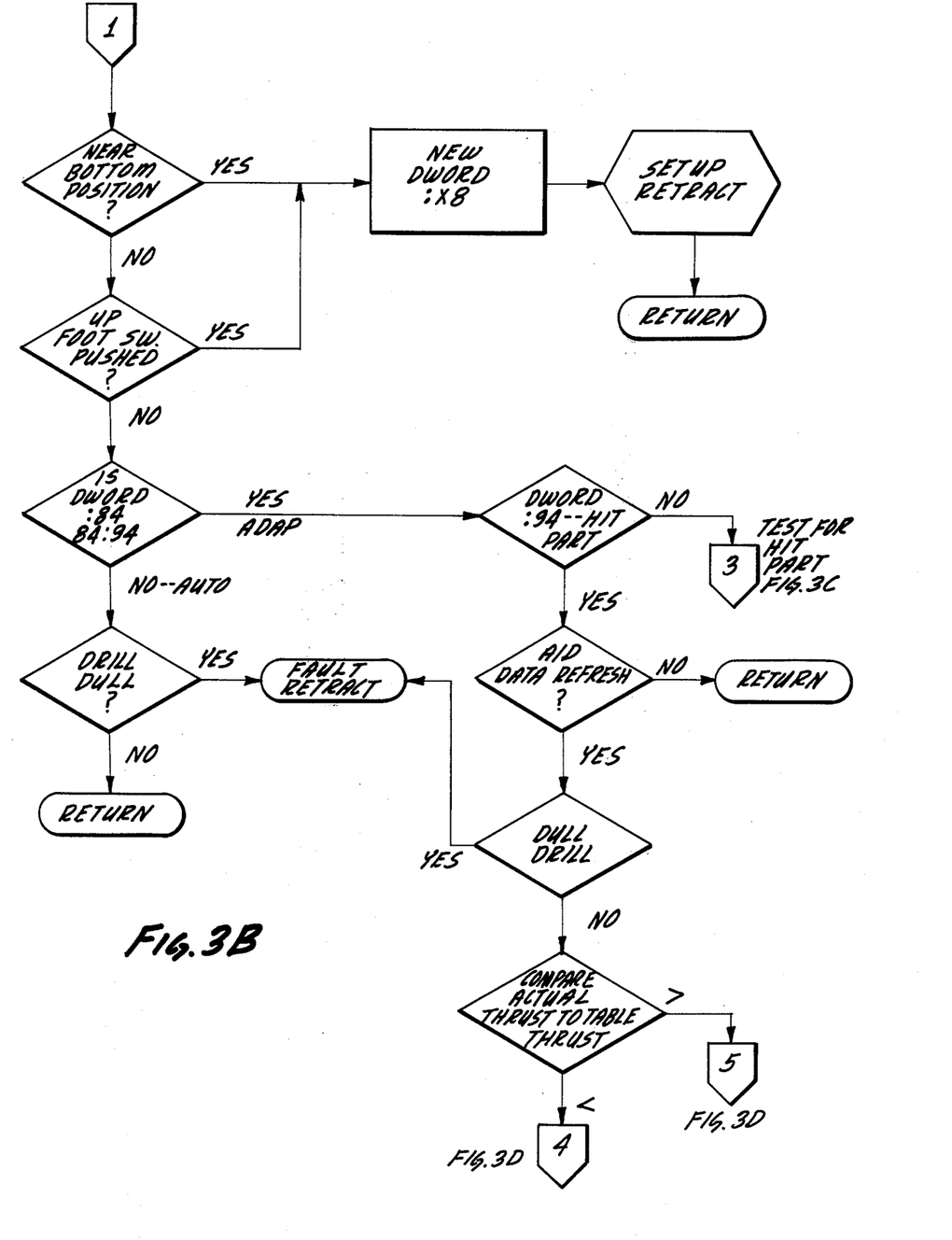
Figure 3C:
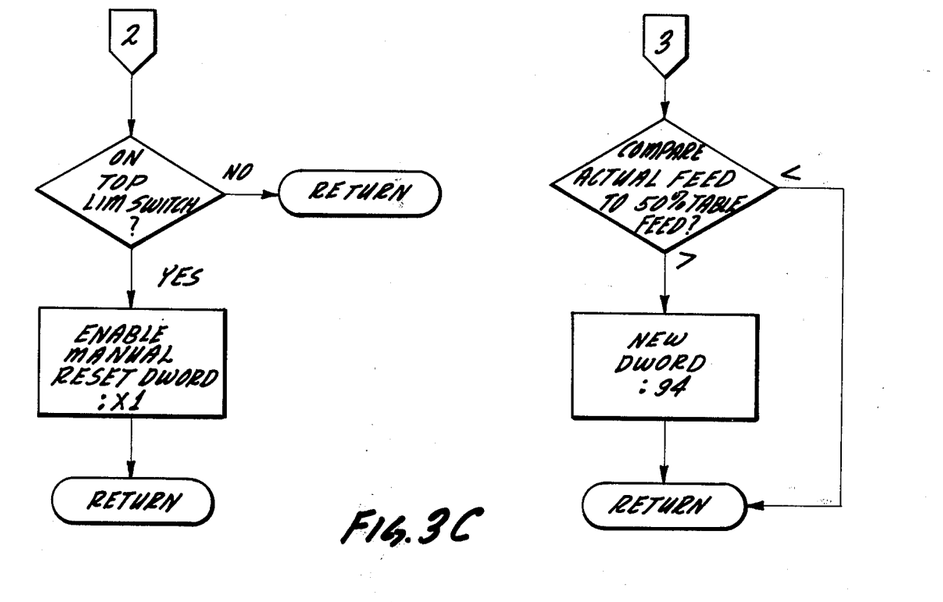
Figure 3D:
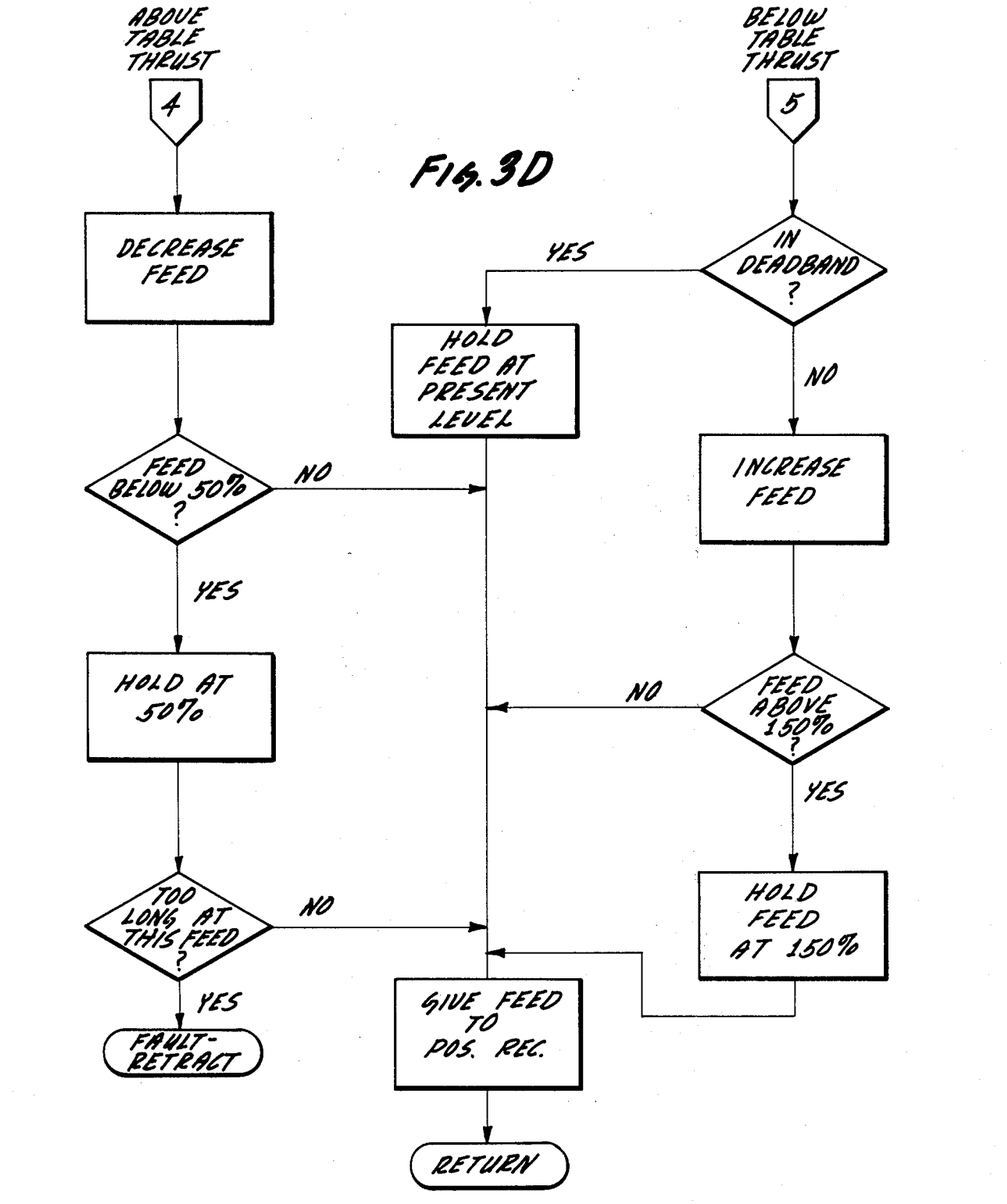

If it is below 50 percent, the machine determines whether it has been too long at that thrust level, and if it has, the machine is faulted and retracted. If it is not below 50 percent, the machine is instructed to hold the feed at 50 percent of the optimum level. The feed rate is then directed to a position record maintained by CPU 32. If it is determined that the actual thrust of the cutting tool 14 is below the optimum thrust, it is determined whether it is within a suitable band width that will yield acceptable results. In the present illustrative embodiment, it has been found that it is acceptable to maintain a thrust load between a band width of 95 and 100 percent of the optimum thrust load. If the thrust of the cutting tool 14 is below the acceptable band width, the CPU 32 generates a control signal directing the feed motor to increase the feed of the cutting tool 14 toward the workpiece W. Once it is determined that the feed rate is above 150 percent, the CPU 32 will direct the feed motor to decrease the feed of the spindle 12 and hold at 150 percent or below.

Figure 7:
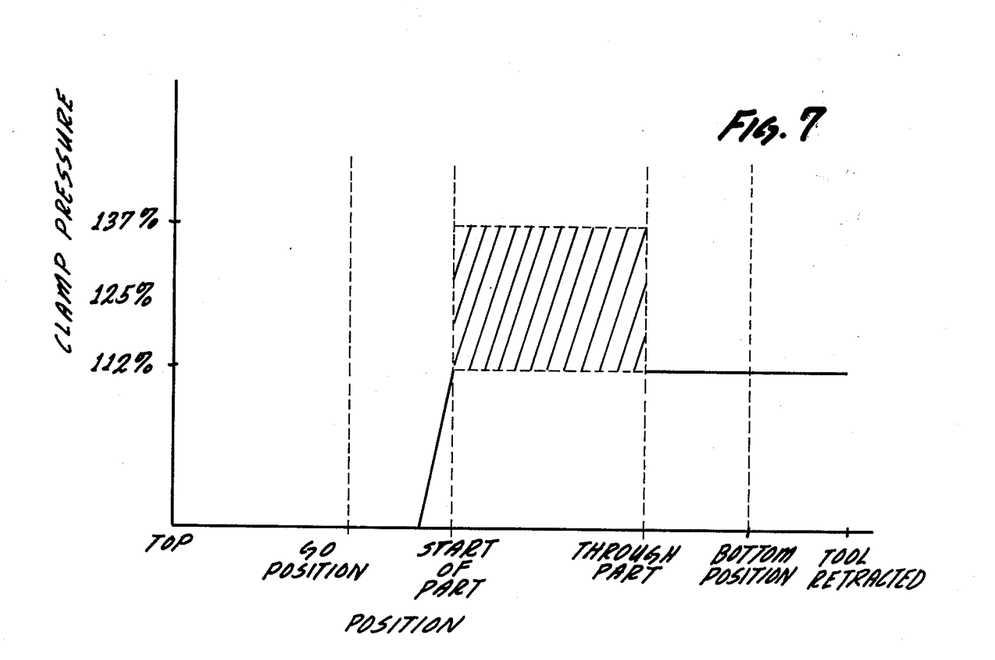
FIG. 7 is a diagram relating the clamping pressure to the position of the cutting tool in the present invention.

Referring to FIG. 7, it is clearly illustrated that as the cutting tool reaches the GO position, its feed rate is decreased to predetermined feed rate and thereafter permitted to vary between 50 and 150 percent of the predetermined feed rate as the thrust of the cutting tool 14 is maintained substantially constant. As the cutting tool begins to emerge from the workpiece W, the load is lessened on the cutting face of the cutting tool 14, and the feed rate is maintained to between 100 and 150 percent of the predetermined feed rate to preclude overheating the materials of the workpiece W immediately surrounding the area of the drilled hole and the drill 14.

Figure 8:
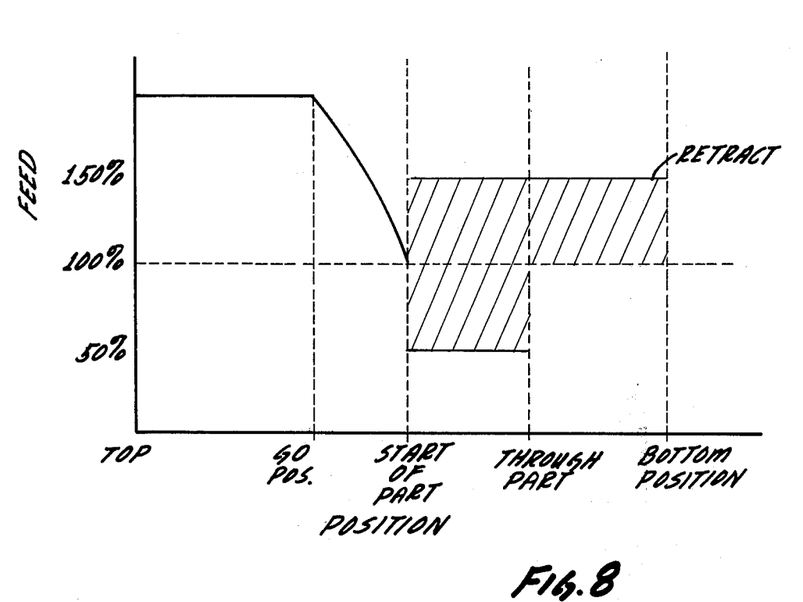
FIG. 8 is a diagram relating the feed rate to the position of the cutting tool for the adaptive control mode of the present invention.

Referring again to FIG. 3B, when it is determined that the bottom position shown in FIG. 8 has been reached, the data control word is set to :X8. When the data control word has been thus set, the feed motor 24 is directed to retract the spindle 12 and continues to do so until the upper limit switch is tripped. When the upper limit switch is tripped, manual control of the machine tool speed 10 is enabled and the data control word reset to :X1.

Figure 5:
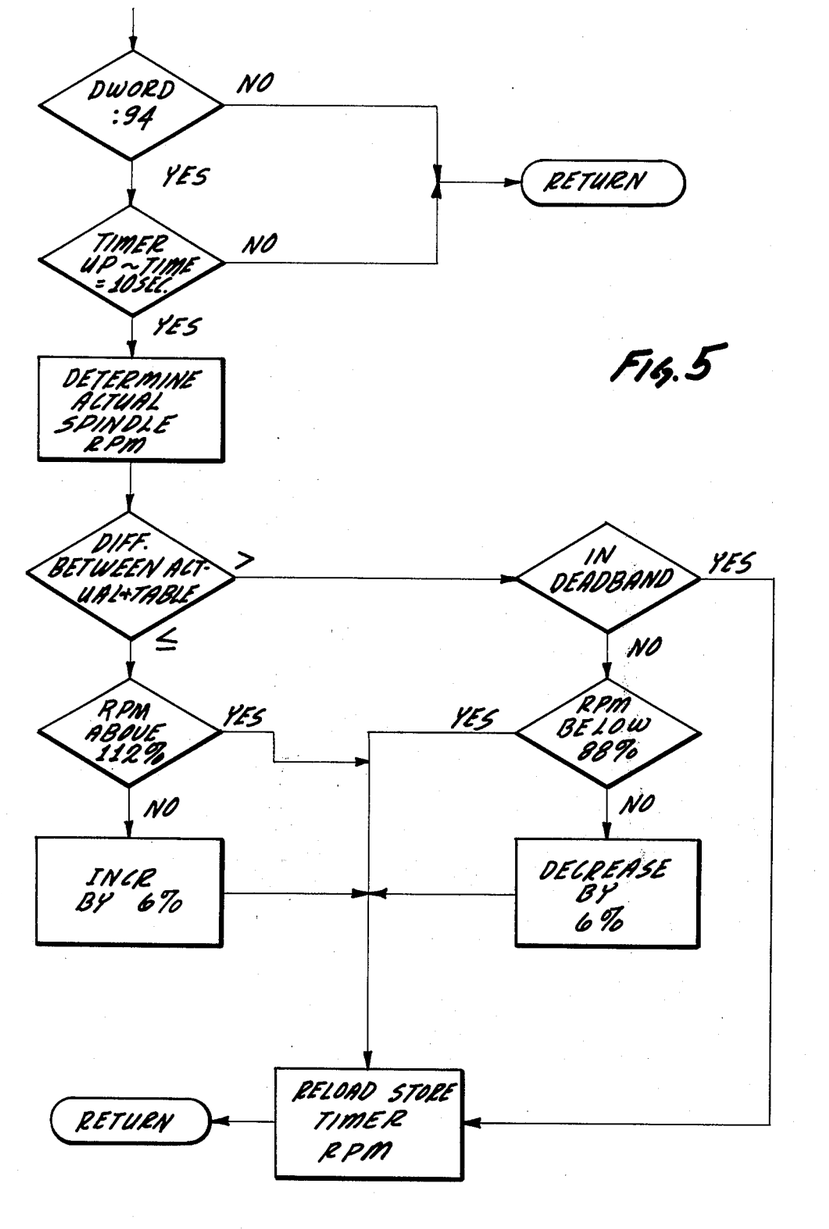
FIG. 5 is a flow chart illustrating the rotational velocity control of the spindle of the present invention.

The flow chart shown in FIG. 5 illustrates the control of the speed during the cutting operation. After the cutting tool 14 has contacted the workpiece W, a check is made to determine if the data control word has been set to 0:94. If it has, the timer of the master control clock of CPU 32 is checked to determine whether a predetermined time period has elapsed since the last check of rotational velocity of spindle 12. If it has, the spindle velocity sensor 26 senses the spindle velocity. The spindle velocity is then compared to the predetermined rotational velocity for the particular cutting operation. If it is within an acceptable band, the timer is restarted and the CPU 32 continues with its other duties. If it is not within an acceptable band but below or above an acceptable band, the CPU 32 generates a control signal that directs the spindle motor to either increase or decrease the speed of the spindle by 6 percent. It will be understood that the 6 percent value as well as the particular band width of 80 to 112 percent of the optimum speed of the spindle is considered to be illustrative and the invention is not limited to such specific values.

Figure 6A:
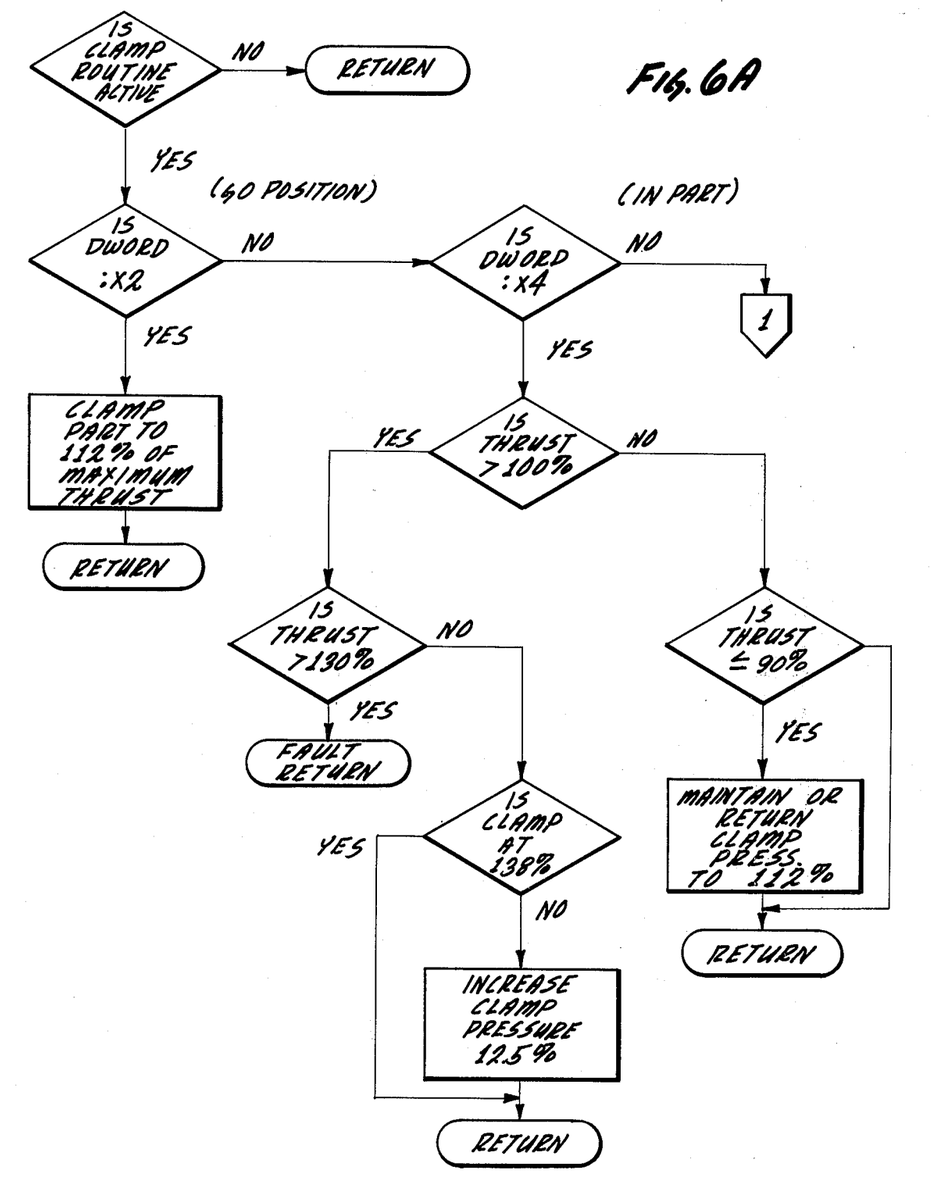

Referring now to FIGS. 6 and 7, the clamping feature of the control system 10 will be described. It will first determine whether the clamp routine is active. If it is, it is determined whether the data control word is :X2. If it is, the data control word is indicative of the start of the GO position and the workpiece W is clamped against the bed 16 by the clamping means 20. The clamping force secures the workpiece W against the bed 16 for 112 percent of the predetermined maximum thrust of the cutting tool 14 against the workpiece W. Thus, the workpiece is clamped with sufficient force to hold it against the bed 16 and yet is not of such force as to mar or otherwise deform the workpiece W.

If the data control word is determined to b :X4, the CPU 32 determines whether the actual thrust of the cutting tool against the workpiece W is greater than 100 percent. If it is less than 100 percent, the clamping pressure is maintained at 112 percent of the predetermined optimum thrust load. If the actual thrust as determined by the thrust sensor 28 is greater than 100 percent, it is then determined whether the thrust is greater than 130 percent. If it is, the thrust load will be great for the cutting tool 12 because the tool is dull or for some other reason, and the cutting operation should be terminated. If it is not, it is then determined whether the clamping force is greater than 130 percent of the optimum clamping force. If it is not, then the clamping force is increased a predetermined portion which is illustrated to be 12½ percent of the predetermined clamping force.

If the control data word has progressed beyond :X4 to :X8, it is determined whether the drill has been retracted out of the part. If the drill has been retracted from the upper surface of the workpiece W, the CPU 32 directs the clamping means 20 to unclamp the part W. Referring to FIG. 7, it will be seen how the clamping pressure varies with respect to the position of the tool 12.

In summary, it has been illustrated how the feed of the cutting tool and the rotational velocity of the tool are intermittently sensed, with the feed being sensed more often, and regulated as required to maintain the thrust of the cutting tool against the workpiece substantially equal to a predetermined value. While the feed rate is permitted to vary, it is sampled frequently to maintain the thrust constant and the speed of the cutting tool is sensed less frequently as an interdependent value to insure that the thrust is maintained substantially constant as well as to maintain the speed of the cutting tool within the workpiece within a predetermined speed range. To maintain the workpiece in an operative position, a clamping force is applied which is maintained at a value sufficiently above the thrust of the cutting tool against the workpiece to insure that the workpiece is maintained in a fixed position relative to the speed of the cutting tool and yet not clamped with a force that would tend to mar or deform the workpiece.

While the invention has been illustrated as embodied in a drill press, it would be within the scope of the invention to apply it to other amenable metal machine processes.

Changes may be made in the combination and arrangement of parts or elements as heretofore set forth in the specifications and shown in the drawings, it being understood that changes may be made in the precise embodiment without departing from the spirit and scope of the invention as defined in the following claims.

APPENDIX 1

SOFT
Material - Steel

| Drill Size (In) | Feed (In/Rev) | Max Thrust (Lbs) | Drill Speed (Rpm) | Feed (In/Min) |
|---|---|---|---|---|
| 1/16 | .001 | 10 | 1,250 | 1.25 |
| 3/32 | .002 | 28 | 1,250 | 2.50 |
| ⅛ | .002 | 42 | 1,250 | 2.50 |
| 5/32 | .002 | 50 | 1,250 | 2.50 |
| 3/16 | .003 | 80 | 1,000 | 3.00 |
| 7/32 | .003 | 95 | 1,000 | 3.00 |
| ¼ | .004 | 145 | 750 | 3.00 |
| 9/32 | .004 | 160 | 700 | 2.80 |
| ⅜ | .005 | 260 | 500 | 2.50 |
| ½ | .007 | 438 | 400 | 2.45 |

APPENDIX 2

MEDIUM
Material - Titanium

| Drill Size (In) | Feed (In/Rev) | Max Thrust (Lbs) | Drill Speed (Rpm) | Feed (In/Min) |
|---|---|---|---|---|
| 1/16 | .001 | 20 | 1,250 | 1.25 |
| 3/32 | .002 | 56 | 1,000 | 2.00 |
| ⅛ | .002 | 84 | 750 | 1.50 |
| 5/32 | .002 | 100 | 675 | 1.35 |
| 3/16 | .003 | 160 | 600 | 1.80 |
| 7/32 | .003 | 190 | 525 | 1.60 |
| ¼ | .004 | 290 | 450 | 1.35 |
| 9/32 | .004 | 320 | 400 | 1.20 |
| ⅜ | .005 | 520 | 300 | 1.50 |
| ½ | .006 | 770 | 200 | 1.20 |

APPENDIX 3

HARD
Material - Inconel

| Drill Size (In) | Feed (In/Rev) | Max Thrust (Lbs) | Drill Speed (Rpm) | Feed (In/Min) |
|---|---|---|---|---|
| 1/16 | .001 | 23 | 1,250 | 1.25 |
| 3/32 | .002 | 64 | 750 | 1.50 |
| ⅛ | .002 | 97 | 600 | 1.20 |
| 5/32 | .002 | 115 | 600 | 1.20 |
| 3/16 | .003 | 184 | 400 | 1.20 |
| 3/16 | .003 | 184 | 400 | 1.20 |
| 7/32 | .003 | 219 | 400 | 1.20 |
| ¼ | .004 | 333 | 300 | 1.20 |
| 9/32 | .004 | 368 | 225 | .90 |
| ⅜ | .005 | 600 | 200 | 1.00 |
| ½ | .006 | 886 | 150 | .90 |

What is claimed as new and useful and desired to be secured by United States Letters Patent is:

1. In a metal working machine for moving a cutting tool through a metal workpiece, the combination of:
   a spindle including means for carrying a cutting tool therein;
   feed drive means for advancing said spindle;
   rotation drive means for rotating said spindle;
   means for clamping the workpiece in a position to permit the cutting tool to move therethrough;
   means for sensing the thrust of the cutting tool against the workpiece and providing an output;
   means for sensing the rotational velocity of said spindle and providing an output;
   input means responsive to only the input of the hardness of the workpiece material and the diameter of the cutting tool for determining the optimum thrust load of the cutting tool against the workpiece;
   control means coupled to the input means, the rotational velocity sensing means, and the thrust sensing means, and providing an output to the feed drive means and the rotational drive means to rotate and advance the cutting tool carried by said spindle into contact with the workpiece at the predetermined optimum thrust load and providing an output to the clamping means to maintain the clamping force in excess of said predetermined thrust load.

2. The combination as in claim 1, wherein the control means generates an output to the feed drive means to slow the cutting tool down to a predetermined feed prior to contacting the workpiece and thereafter maintaining a substantially constant thrust load for the cutting tool until the cutting operation is terminated.

3. The combination as in claim 1, wherein the control means provides an output to the rotational drive means to maintain the rotational velocity of the spindle within a predetermined range.

4. The combination as in claim 1, wherein the actual feed rate of the spindle is permitted to vary a predetermined amount below the predetermined feed rate before the control means provides an output directing the feed drive means to slow up toward the predetermined feed rate.

5. The combination as in claim 1, wherein the actual feed rate of the spindle is permitted to vary a predetermined amount above the predetermined feed rate before the control means provides an output directing the feed drive means to slow down toward the predetermined feed rate.

6. The combination as in claim 4, wherein the amount of feed rate is permitted to vary below the predetermined feed rate before the control means generates a speed up output signal is approximately 50 percent of the predetermined feed.

7. The combination as in claim 5, wherein the amount the feed rate is permitted to vary above the predetermined feed rate before the control means generates a slow down output signal is approximately 125 percent of the predetermined feed.

8. The combination as in claim 1, wherein the control means will terminate the metal machining operation by said tool when the tool is advancing through the workpiece at less than approximately 50 percent of a predetermined feed rate for a particular metal machining operation and the actual thrust load of the cutting tool against the workpiece is substantially at the predetermined thrust load.

9. The combination as in claim 1, wherein the control means will terminate the metal machining operation when the cutting tool is advancing through the workpiece at a predetermined thrust load on said workpiece and the feed rate of the tool falls below a predetermined value and remains below such value for a predetermined period of time.

10. The combination as in claim 1, wherein the means sensing the rotational velocity of the cutting tool and the means sensing the thrust of the cutting tool against the workpiece sense such values on a predetermined intermittent basis.

11. The combination as in claim 10, wherein the thrust of the cutting tool is sensed more frequently than the rotational velocity.

12. In a metal working machine for moving a cutting tool through a metal workpiece, the combination of:
a spindle including means for carrying a cutting tool therein;
feed drive means for advancing said spindle;
rotation drive means for rotating said spindle;
means for clamping the workpiece in a position to permit the cutting tool to move therethrough;
means for sensing the thrust of the cutting tool against the workpiece and providing an output;
means for sensing the rotational velocity of said spindle and providing an output;
selectable means for representing only the hardness of a predetermined workpiece material and a predetermined cutting tool dimension;
input means connected to said selectable means and responsive only thereto for determining an optimum thrust load against a predetermined workpiece material of a cutting tool having a predetermined tool dimension;
control means coupled to the input means, the rotational velocity sensing means, and the thrust sensing means, and providing an output to the feed drive means and the rotational drive means to rotate and advance the cutting tool carried by said spindle to contact the workpiece at a predetermined optimum thrust load and to maintain the clamping force in excess of said predetermined thrust load.

13. The combination as in claim 12, wherein the control means generates an output to the rotational means to slow the cutting tool down to a predetermined feed prior to contacting the workpiece.

14. The combination as in claim 12, wherein the control means provides an output to the rotational drive means to maintain the rotational velocity of the spindle within a predetermined range.

15. The combination as in claim 12, wherein the actual feed rate of the cutting tool is permitted to vary a predetermined amount below a predetermined feed rate and a predetermined amount above the predetermined feed rate before the control means generates an output directing the feed means to return to the predetermined feed rate.

16. The combination as in claim 12, wherein the control means will terminate the metal machining operation by said tool when the cutting tool is advancing through the workpiece at less than approximately 50 percent of a predetermined feed rate for a particular metal machining operation and the actual thrust load of the cutting tool against the workpiece is substantially at the predetermined thrust load.

17. The combination as in claim 12, wherein the data processing means will terminate the metal machining operation when the cutting tool is advancing through the workpiece at a predetermined thrust load on said workpiece and the feed rate of the tool falls below a predetermined value and remains below such value for a predetermined period of time.

18. The combination as in claim 12, wherein the means sensing the rotational velocity of the cutting tool and the means sensing the thrust of the cutting tool against the workpiece sense such values on a predetermined intermittent basis.

19. The combination as in claim 12, wherein the thrust of the cutting tool is sensed more frequently than the rotational velocity.

20. In a metal working machine for moving a cutting tool through a metal workpiece, the combination of:
a spindle including means for carrying a cutting tool therein;
feed drive means for advancing said spindle;
rotation drive means for rotating said spindle;
means for clamping the workpiece in a position to permit the cutting tool to move therethrough;
means for sensing the thrust of the cutting tool against the workpiece and providing an output representative of such thrust;
means for sensing rotational velocity of said spindle and providing an output representative of such thrust;
selectable input means for representing only the hardness of a predetermined workpiece material and a predetermined cutting tool diameter;
means for storing predetermined optimum thrust loads for a cutting tool against a predetermined workpiece material and for a predetermined cutting tool diameter;
data processing means coupled to the input means, the rotational velocity sensing means, and the thrust sensing means, and adapted to:
a. select a predetermined thrust load in response to the input means,
b. convert the thrust load to predetermined signals to the rotation drive means and to the feed drive means,
c. compare the actual rotational velocity of the spindle to the predetermined rotational velocity of the spindle and to compare the actual thrust of the cutting tool against the workpiece to the selected thrust,
d. generate control signals to the rotation drive means and to the feed means and to the clamping means, in response to such comparison, that will direct the rotation drive means and feed means to rotate and advance the spindle so that it will contact the workpiece at the predetermined thrust load and to maintain the clamping force in excess of the predetermined thrust load;

means to couple the control signals generated by the data processing means to the rotation drive means, the feed means, and the clamping means.

21. The combination as in claim 20, wherein the data processing means generates a control signal to the rotational drive means to rotate the spindle within a predetermined range.

22. The combination as in claim 20, wherein the actual feed rate of the cutting tool is permitted to vary a predetermined amount below a predetermined feed rate and a predetermined amount above the predetermined feed rate before the control means generates an output signal directing the feed means to return to the predetermined feed rate.

23. The combination as in claim 20, wherein the data processing means will terminate the metal machining operation by said tool when the cutting tool is advancing through the workpiece at less than approximately 50 percent of a predetermined feed rate for a particular metal machining operation and the actual thrust load of the cutting tool against the workpiece is substantially at the predetermined thrust load.

24. The combination as in claim 20, wherein the data processing means will terminate the metal machining operation when the cutting tool is advancing through the workpiece at a predetermined thrust load on said workpiece and the feed rate of the tool falls below a predetermined value and remains below such value for a predetermined period of time.

25. The combination as in claim 20, wherein the means sensing the rotational velocity of the cutting tool and the means sensing the thrust of the cutting tool against the workpiece sense such values on a predetermined intermittent basis.

26. The combination as in claim 20, wherein the thrust of the cutting tool is sensed more frequently than the rotational velocity.

27. In a control system adapted to control a metal machining system intended primarily for the machining of metal workpieces, the combination comprising:

a cutting tool adapted to cut a metal workpiece;
means to rotate the tool;
means to feed the tool toward the metal workpiece;
means to sense the rotational speed of the cutting tool and to provide an output representative of such speed;
means to sense the thrust of the cutting tool against the metal workpiece and to provide an output representative of such thrust;
means to store predetermined optimum thrust loads for the cutting tool against the workpiece for a predetermined material hardness and for a predetermined tool dimension;
input means only selectable to represent a predetermined workpiece material hardness and a predetermined cutting tool dimension;
data processing means coupled to the input means, the rotational speed sensing means, and the thrust sensing means, and adapted to:
  a. select a predetermined thrust load in response to the input means,
  b. convert the thrust load to predetermined signals to the rotating means and to the feed means,
  c. compare the actual rotational speed of the cutting tool to the predetermined rotational speed of the cutting tool and to compare the actual thrust of the cutting tool against the workpiece to the selected thrust load, and
  d. generate signals to the rotating means and to the feed means, in response to such comparison, that will direct the rotating means and feed means to rotate the cutting tool within a predetermined rotational speed band and feed the cutting tool so that by control of the feed rate of said tool it will contact the workpiece at the predetermined thrust load, means to couple the signals generated by the data processing means to the rotating means and to the feed means.

28. A control system as in claim 27, wherein the data processing means generates a signal to the rotational means to maintain the said rotation within a predetermined range.

29. A control system as in claim 27, wherein the input means further comprises manually settable means indicating that the cutting tool has contacted the workpiece and that the cutting tool has advanced sufficiently from the initial workpiece contacting position to a position that would complete an intended metal machining operation.

30. A control system as in claim 27, wherein the actual feed rate of the cutting tool is permitted to vary a predetermined amount below the predetermined rotational speed before the data processing means generates a signal directing the feed means to speed up toward the predetermined feed rate.

31. A control system as in claim 27, wherein the actual feed rate of the cutting tool is permitted a predetermined amount above the predetermined feed rate before the data processing means generates a signal directing the feed means to slow down toward the predetermined feed rate.

32. A control system as in claim 30, wherein the amount the feed rate is permitted to vary below the predetermined feed rate before the data processing means generates a speed up signal is approximately 50 percent.

33. A control system as in claim 31, wherein the amount the feed rate is permitted to vary above the predetermined feed rate before the data processing means generates a slow down signal is approximately 125 percent.

34. A control system as in claim 27, wherein the data processing means will terminate the metal machining operation by said tool when the cutting tool is advancing through the workpiece at less than approximately 50 percent of a predetermined feed rate for a particular metal machining operation and the actual thrust load of the cutting tool against the workpiece is substantially at the predetermined thrust load.

35. A control system as in claim 27, wherein the data processing means when the cutting tool is advancing through the workpiece at a predetermined thrust load on said workpiece will terminate the metal machining operation when the feed rate of the tool falls below a predetermined value and remains below such value for a predetermined period of time.

36. A control system as in claim 27, wherein the means sensing the rotational speed of the cutting tool and the means sensing the thrust of the cutting tool against the workpiece sense such values on a predetermined intermittent basis.

37. A control system as in claim 36, wherein the thrust of the cutting tool is sensed more frequently by said means than the rotational speed sensing means senses the rotational speed of the cutting tool.

* * * * *